(12) United States Patent
Khoshkava et al.

(10) Patent No.: US 10,217,333 B2
(45) Date of Patent: *Feb. 26, 2019

(54) HAPTIC ENABLED USER INTERFACE DEVICE INCORPORATING ELECTROPERMANENT MAGNET

(71) Applicant: IMMERSION CORPORATION, San Jose, CA (US)

(72) Inventors: Vahid Khoshkava, Montreal (CA); Juan Manuel Cruz-Hernandez, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,423

(22) Filed: Aug. 13, 2018

(65) Prior Publication Data
US 2018/0350205 A1 Dec. 6, 2018

Related U.S. Application Data

(63) Continuation of application No. 15/285,230, filed on Oct. 4, 2016, now Pat. No. 10,049,536.

(51) Int. Cl.
*H04B 3/36* (2006.01)
*G08B 6/00* (2006.01)
(Continued)

(52) U.S. Cl.
CPC ............ *G08B 6/00* (2013.01); *A63F 13/24* (2014.09); *A63F 13/285* (2014.09);
(Continued)

(58) Field of Classification Search
CPC ........ G08B 6/00; H02K 33/02; H01F 13/003; H01F 7/0226; A63F 13/285; A63F 13/24
(Continued)

(56) References Cited

U.S. PATENT DOCUMENTS 9,639,158 B2 * 5/2017 Levesque ................ G06F 3/016
9,671,865 B2 * 6/2017 Modarres ................ G06F 3/016
(Continued)

FOREIGN PATENT DOCUMENTS

| WO | 2005036377 A1 | 4/2005 |
| WO | 2016010180 A1 | 1/2016 |
| WO | 2016125183 A2 | 8/2016 |

OTHER PUBLICATIONS

European Search Report for European Application 17194490 dated Jan. 31, 2018.
(Continued)

*Primary Examiner* — Dhaval Patel
(74) *Attorney, Agent, or Firm* — Medler Ferro Woodhouse & Mills PLLC (57) ABSTRACT

A haptic actuator is presented. The haptic actuator has an electropermanent magnet having a deactivated state and an activated state for a net magnetic field thereof. A layer of ferromagnetic material or magneto-active polymer is located opposite an end of the electropermanent magnet, and is configured to generate a haptic effect by being actuated toward the end of the electropermanent magnet in response to the net magnetic field of the electropermanent magnet being in the activated state.

20 Claims, 9 Drawing Sheets

(51) Int. Cl.
  *A63F 13/285* (2014.01)
  *A63F 13/24* (2014.01)
  *H02K 33/02* (2006.01)
  *H01F 13/00* (2006.01)
  *H01F 7/02* (2006.01)

(52) U.S. Cl.
  CPC ......... *H01F 7/0226* (2013.01); *H01F 13/003* (2013.01); *H02K 33/02* (2013.01)

(58) Field of Classification Search
  USPC ............ 340/407.1, 407.2; 345/156, 160, 173
  See application file for complete search history.

(56) References Cited

U.S. PATENT DOCUMENTS

| | | |
|---|---|---|
| 2006/0290662 A1 | 12/2006 | Houston et al. |
| 2012/0032768 A1 | 2/2012 | Fox et al. |
| 2012/0043495 A1 | 2/2012 | Gangopadhyay et al. |
| 2012/0146890 A1 | 6/2012 | Karstens |
| 2013/0285479 A1 | 10/2013 | Kinoshita |
| 2015/0268772 A1 | 9/2015 | Wang et al. |
| 2015/0277562 A1 | 10/2015 | Bard et al. |
| 2016/0172891 A1 | 6/2016 | Filippenko et al. |
| 2016/0188086 A1 | 6/2016 | Yairi et al. |
| 2017/0017273 A1 | 1/2017 | Weldon et al. |
| 2017/0120297 A1 | 5/2017 | Chun |

OTHER PUBLICATIONS

"Electropermanent Magnets," http://www.wikipedia.org/w/index.php?title=Electropermanent_magnet&oldid=723700930.

Deyle, Travis, "Electropermanent magnets: Programmable Magnets with Zero Static Power Consumption Enable Smallest Modular Robots Yet", Dec. 7, 2010, 12 pages; http://www.hizook.com/blog/2010/12/07/electropermanent-magnets-programmable-magnets-zero-static-power-consumption-enable-s.

Jochum, Andreas, "EPM 2.5 from Nicadrone.com an Electro permanent magnet", Published on Feb. 21, 2015, Datasheet: http://nicadrone.com//img/cms/EMP688; https://www.youtube.com/watch?v=w0EbsQ3QKMw.

The foreign and NPL references were provided in the parent application, U.S. Appl. No. 15/285,230.

* cited by examiner

HAPTIC ENABLED USER INTERFACE DEVICE INCORPORATING ELECTROPERMANENT MAGNET

CROSS REFERENCE TO RELATED APPLICATIONS

This application is a continuation of U.S. application Ser. No. 15/285,230, filed Oct. 4, 2016 and issued as U.S. Pat. No. 10,049,536, the entire disclosure of which is hereby incorporated by reference.

FIELD OF THE INVENTION

The present invention is directed to a haptic actuator that incorporates an electropermanent magnet, and that has application in user interfaces, gaming, automotive, wearable devices, and consumer electronics.

BACKGROUND

Video games and video game systems have become even more popular due to the marketing toward, and resulting participation from, casual gamers. Conventional video game devices or controllers use visual and auditory cues to provide feedback to a user. In some interface devices, kinesthetic feedback (such as active and resistive force feedback) and/or tactile feedback (such as vibration or texture) is also provided to the user, more generally known collectively as "haptic feedback" or "haptic effects". Haptic effects can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment. Some gaming systems include an actuator attached to a controller housing to generate haptic effects.

Other devices, such as medical devices, automotive controls, remote controls, and other similar devices for which a user interacts with user input elements to cause an action can also benefit from haptic effects. Haptic effects may be employed in these devices to alert the user to specific events, or provide realistic feedback to the user regarding interaction of the device.

SUMMARY

One aspect of the embodiments herein relate to a haptic actuator comprising an electropermanent magnet having a deactivated state and an activated state for a net magnetic field thereof, and a layer of ferromagnetic material or magneto-active polymer located opposite an end of the electropermanent magnet. The layer of ferromagnetic material or magneto-active polymer is configured to generate a haptic effect by being actuated toward the end of the electropermanent magnet in response to the net magnetic field of the electropermanent magnet being in the activated state.

In an embodiment, the layer of ferromagnetic material or magneto-active polymer is attracted to the electropermanent magnet when the net magnetic field of the electropermanent magnet is in the activated state, and is not attracted to the electropermanent magnet when the net magnetic field of the electropermanent magnet is in the deactivated state.

In an embodiment, the haptic actuator comprises the layer of ferromagnetic material, the ferromagnetic material comprising at least one of iron, cobalt, and nickel, and not comprising any of steel, aluminum, copper, lead, and zinc.

In an embodiment, the haptic actuator comprises the layer of magneto-active polymer, the magneto-active polymer comprising a polymer matrix and ferromagnetic material.

In an embodiment, the electropermanent magnet has a thickness along an axis of the net magnetic field thereof that is in a range of between 100 microns and 1 mm.

In an embodiment, a distance between the end of the electropermanent magnet and the layer of ferromagnetic material or magneto-active polymer is in a range of between 20 µm and 50 µm.

In an embodiment, a thickness of the layer of ferromagnetic material or magneto-active polymer is in a range of between 0.2 mm and 5 mm.

In an embodiment, when the net magnetic field of the electropermanent magnet is in the activated state, the electropermanent magnet exerts a force of at least 1G on the layer of ferromagnetic material or magneto-active polymer.

In an embodiment, the haptic actuator further comprises a power source connected to the electropermanent magnet and is configured to apply alternating current to the electropermanent magnet, wherein the layer of ferromagnetic material or magneto-active polymer is configured to vibrate in response to the alternating current being applied to the electropermanent magnet.

In an embodiment, the haptic actuator further comprises a controller connected to the power source and configured to cause the power source to provide the alternating current to the electropermanent magnet at a frequency that is based on whether the haptic actuator is to generate a vibration-based haptic effect or whether the haptic actuator is to generate a non-vibration-based haptic effect.

In an embodiment, the controller is configured to cause the alternating current to have a frequency between 1 Hz and 10 Hz in response to determining that the haptic actuator is to generate a non-vibration-based haptic effect, and is configured to cause the alternating current to have a frequency between 80 Hz and 200 Hz in response to determining that the haptic actuator is to generate a vibration-based haptic effect.

In an embodiment, the electropermanent magnet comprises: a first magnet having magnetic poles that are selectively switchable between a first polarity and a second polarity opposite the first polarity; a second magnet adjacent to the first magnet and having its magnetic poles fixed at the first polarity; a device adjacent to the first magnet and configured to switch a polarity of the magnetic poles of the first magnet between the first polarity and the second polarity.

In an embodiment, the device configured to switch the polarity of the magnetic poles of the first magnet between the first polarity and the second polarity is a conductive coil wrapped around the first magnet, and not wrapped around the second magnet.

In an embodiment, the device configured to switch the polarity of the magnetic poles of the first magnet between the first polarity and the second polarity comprises a heating element adjacent to the first magnet.

In an embodiment, the haptic actuator comprises the layer of ferromagnetic material, and wherein the layer of ferromagnetic material is one side of a metal casing in which the electropermanent magnet is located.

In an embodiment, a side of the metal casing that is adjacent to the layer of ferromagnetic material is configured to deform away from the electropermanent magnet in response to the net magnetic field of the electropermanent magnet being activated.

One aspect of the embodiments herein relate to a haptic enabled device comprising a housing having a support surface and at least one haptic actuator mounted on the support surface. The haptic actuator comprises an electropermanent magnet having a deactivated state and an activated state for a net magnetic field thereof. The haptic actuator further comprises a layer of ferromagnetic material or magneto-active polymer attached to or in contact with an interior surface of the haptic enabled device. The layer of ferromagnetic material or magneto-active polymer faces the support surface on which the haptic actuator is mounted and is located opposite a corresponding end of the electropermanent magnet, and is configured to generate a haptic effect at an exterior surface of the haptic enabled device by being actuated toward the end of the electropermanent magnet in response to the net magnetic field of the electropermanent magnet in the activated state.

In an embodiment, the haptic enabled device further comprises a display device attached to the housing and having a front surface that forms part of the exterior surface of the haptic enabled device, and having a back surface that forms part of the interior surface of the haptic enabled device, wherein the layer of ferromagnetic material or magneto-active polymer is located on the back surface of the display device, and is configured to generate the haptic effect at the front surface of the display device.

In an embodiment, the layer of ferromagnetic material or magneto-active polymer is a coating on the back surface of the display device.

One aspect of the embodiments herein relate to a haptic enabled device comprising a housing having a support surface, a display device attached to the housing, and an array of haptic actuators. The display device has a front surface that forms part of an exterior surface of the haptic enabled device, and a back surface that forms part of an interior surface of the haptic enabled device. The array of haptic actuators is mounted on the support surface. Each of the array of haptic actuators comprises a corresponding electropermanent magnet of a plurality of electropermanent magnets, wherein the corresponding electropermanent magnet has a deactivated state and an activated state for a net magnetic field thereof, and further comprises a corresponding portion of a plurality of co-planar portions of a layer of ferromagnetic material or magneto-active polymer, the layer facing the support surface on which the array of haptic actuators are mounted. The corresponding portion of the layer of ferromagnetic material or magneto-active polymer is attached to or in contact with the back surface of the display device, is located opposite an end of the corresponding electropermanent magnet, and is configured to generate a haptic effect at the front surface of the display device by being actuated toward the end of the corresponding electropermanent magnet in response to the net magnetic field of the corresponding electropermanent magnet being in the activated state.

In an embodiment, the haptic enabled device comprises a controller configured to select a subset of the array of haptic actuators to activate.

Features, objects, and advantages of embodiments hereof will become apparent to those skilled in the art by reading the following detailed description where references will be made to the appended figures.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments hereof relate to a haptic actuator having an electropermanent magnet and a layer of ferromagnetic material or magneto-active polymer. The haptic actuator uses the electropermanent magnet to actuate the layer of ferromagnetic material or magneto-active polymer. In an embodiment, the electropermanent magnet may be configured to be activated to generate a strong magnetic field, such as a magnetic field having a strength of a few Teslas, to generate a strong force to deform the layer of ferromagnetic material or magneto-active polymer. The net magnetic field of the electropermanent magnet may also be deactivated, which may cause the layer of ferromagnetic material or magneto-active polymer to move back toward its un-deformed position. Thus, embodiments hereof relate to a haptic actuator which can generate a strong magnetic field, and can also control the activation and deactivation of the magnetic field. In some instances, the activation and deactivation of the net magnetic field of the electropermanent magnet may be repeated in a cyclical manner to create oscillation in the movement of the layer of ferromagnetic material or magneto-active layer. The oscillation may occur at a sufficiently high frequency (e.g., 200 Hz) to create a vibration-based haptic effect or other haptic effect. It may also occur at a lower frequency to create a non-vibration based haptic effect or other haptic effect. For example, the force generated by the electropermanent magnet may be strong enough to create a more general deformation-based haptic effect in which the layer of ferromagnetic material or magneto-active polymer deforms at a lower frequency of, e.g., 5 Hz.

In an embodiment, the haptic actuator may be incorporated into a haptic enabled device (e.g., a mobile phone). For instance, it may be placed behind an exterior surface of the haptic enabled device. The haptic actuator may be incorporated in a manner that vibrates the exterior surface, or that more generally deforms the exterior surface. This deformation may be in an inward direction, or may be in an outward direction. In an embodiment, the haptic enabled device may incorporate an array of haptic actuators.

Figure 1A:
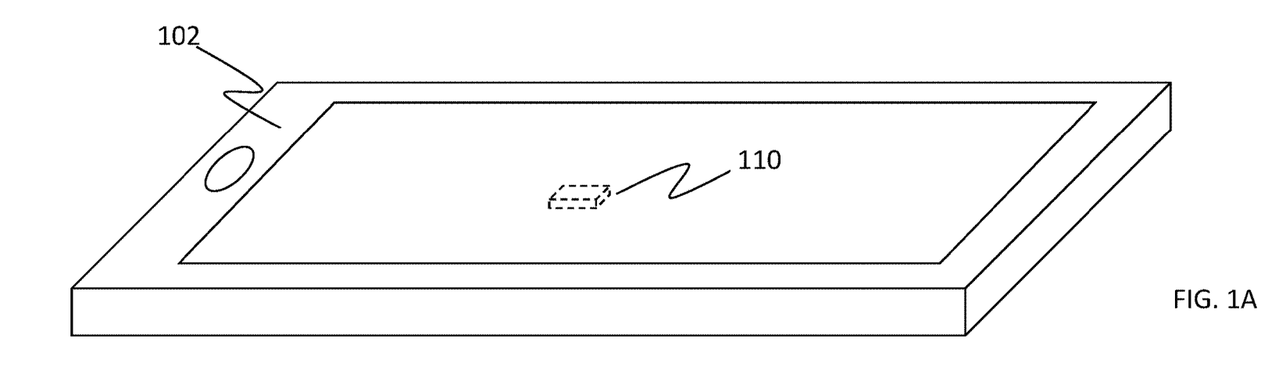
FIG. 1A is a perspective view of a mobile device that includes a haptic actuator having an electropermanent magnet, according to an embodiment hereof.
Figure 1B:
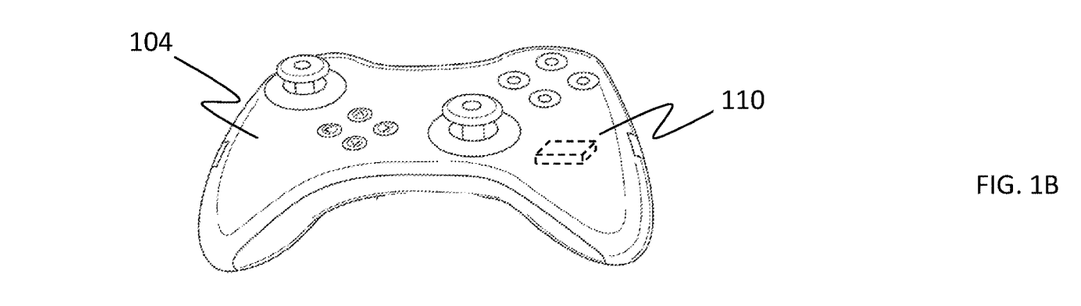
FIG. 1B is a perspective view of a game controller that includes a haptic actuator having an electropermanent magnet, according to an embodiment hereof.

FIGS. 1A and 1B show a haptic actuator 110 as part of various haptic enabled devices, including a user interface device 102 and a user interface device 104. More specifically, FIG. 1A provides a perspective view of a user interface device 102 that is a mobile phone which has a haptic actuator 110 that incorporates an electropermanent magnet 112 in accordance with an embodiment hereof. FIG. 1B provides a perspective view of a user interface device 104 that is a game controller which has the haptic actuator 110 that incorporates the electropermanent magnet 112. In other embodiments, any other user interface device, such as a user interface device used for a wearables application, automotive application, virtual/augmented reality application, or other application may incorporate the haptic actuator 110 to generate haptic effects. In some cases, the haptic actuator 110 may be a body actuator that is configured to generate a rumble haptic effect. In some cases, the haptic actuator 110 may be a targeted actuator that is configured to generate kinesthetic haptic effects.

Figure 2A:
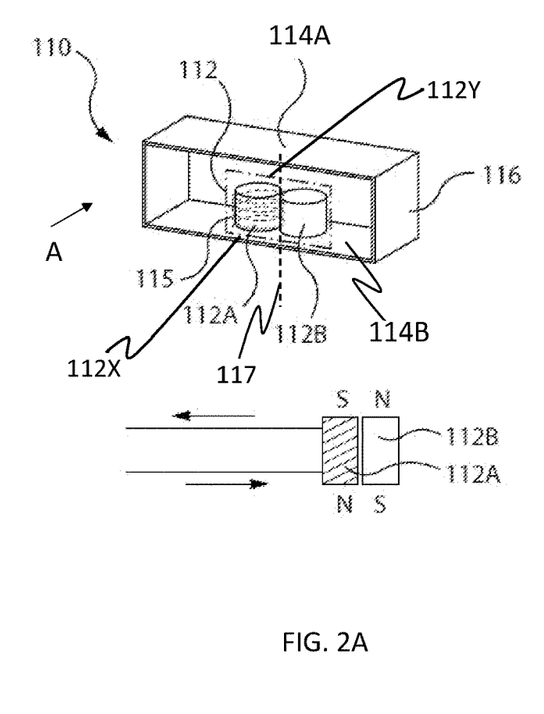
FIGS. 2A and 2B are perspective views of a haptic actuator having an electropermanent magnet, according to an embodiment hereof.
Figure 2B:
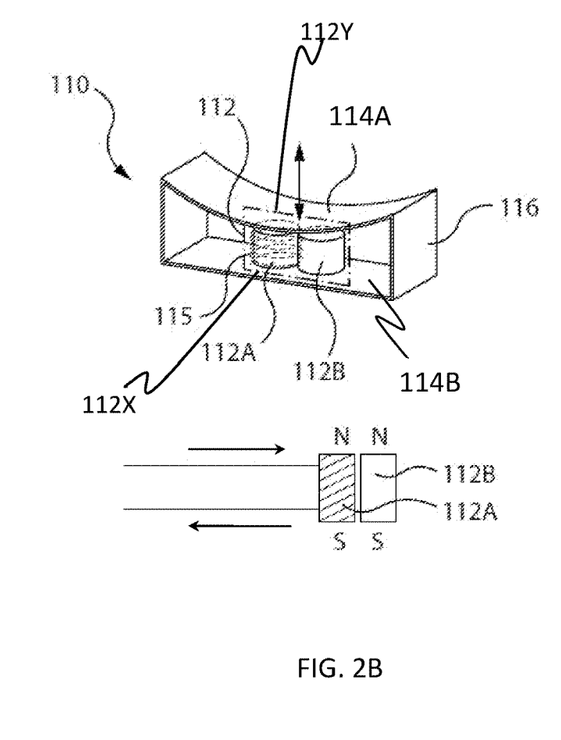

FIGS. 2A and 2B provide a perspective view of an example haptic actuator 110, according to an embodiment herein. In this example, the haptic actuator 110 includes an electropermanent magnet 112 and a layer 114A of ferromagnetic material, such as iron, cobalt, nickel, or any combination thereof. The ferromagnetic material may, in an embodiment, exclude any of steel, aluminum, copper, lead, and/or zinc. In an example, the layer 114A of ferromagnetic material may be one side of a metal casing 116 that houses (e.g., at least partially encloses) the electropermanent magnet 112. Example shapes for this metal casing 116 include a rectangular frame having four sides, as shown in FIGS. 2A and 2B, or a cube having a hollow interior for housing the electropermanent magnet 112. In one instance, the metal casing 116 may include a layer 114B (e.g., a layer of ferromagnetic material, plastic, or other material) on which the electropermanent magnet 112 is mounted. A first end 112X (e.g., a bottom end) of the electropermanent magnet 112 may be mounted on an inner surface of the layer 114B, while an opposite second end 112Y (e.g., top end) of the electropermanent magnet 112 may face, or be opposed to, the layer 114A. The second end 112Y of the electropermanent magnet 112 that faces the layer 114A may be separated from the inner surface of layer 114A by a distance that is in a range of, e.g., between 20 µm and 50 µm. When a net magnetic field of the electropermanent magnet 112 is activated, the south and north pole of the electropermanent magnet 112 may be located at the first end 112X and second end 112Y, respectively. In one example, the thickness of the layer 114A of ferromagnetic material (or layer of magneto-active polymer) may be in a range of between 0.2 mm and 5 mm. In an example, the electropermanent magnet 112 has a thickness, along an axis 117 of the net magnetic field thereof, that is in a range of between 100 microns and 1 mm.

In an embodiment, the electropermanent magnet 112 may include at least two magnets, such as a first magnet 112A having magnetic poles that are selectively switchable between a first polarity and a second polarity opposite the first polarity, and a second magnet 112B adjacent to the first magnet and having its magnetic poles fixed at the first polarity. For instance, the first magnet 112A (e.g., a programmable magnet) may be made of a magnetically semi-hard material, such as an aluminum nickel cobalt (AlNiCo) alloy, while the second magnet 112B may be made of a magnetically hard material, such as neodymium. In one example, the magnetically hard material of magnet 112B may have a magnetic coercivity value of 800-950 KA/m, while the magnetically semi-hard material of magnet 112A may have a magnetic coercivity value of 30-100 KA/m (the layer 114A of ferromagnetic material in this example may comprise a magnetically soft material, with an example magnetic coercivity value of 0.16 KA/m).

In an embodiment, the magnetically semi-hard and magnetically hard material may have a magnetic field strength in a range of 0.1 Tesla to 1 Tesla, or in a range of 1 Tesla to 10 Teslas. This magnetic field strength may allow the electropermanent magnet 112 to generate sufficient force to deform various surfaces for a general deformation-based haptic effect or a more specific deformation-based haptic effect, such as a high-amplitude vibration-based haptic effect. Further, the electropermanent magnet 112 may be capable of maintaining a net magnetic field in an activated state without consuming power, because the magnetically semi-hard material of magnet 112A may have sufficient remanence to maintain its magnetic field in the absence of any external power, and the magnetically hard material of magnet 112B may be considered to have a fixed magnetic field.

In an embodiment, the activation state of the net magnetic field depends on whether the magnets 112A and 112B have magnetic fields in the same direction (corresponding magnetic fields), or in opposite directions (opposed magnetic fields). In FIGS. 2A-2B, the magnetic field of magnet 112B may be fixed, while the magnetic field of magnet 112A may be switchable in direction by a device adjacent to the magnet 112A and configured to switch a polarity of the magnetic poles of the magnet 112A between a first polarity (e.g., in a N-S direction) and a second polarity (e.g., in a S-N direction) opposite the first polarity. The device configured to switch the polarity of the magnetic poles of the magnet 112A may include a conductive coil, a heating element, any other switching device, or any combination thereof. For example, the device may include a copper coil 115 wrapped around only magnet 112A, or around both magnets 112A and 112B. The copper coil 115 may generate a magnetic field when an external input such as an electrical current is passed through the coil, as represented by the arrows in FIGS. 2A and 2B. The coil may thus magnetize the semi-hard material of magnet 112A by causing a magnetic field of the magnet 112A to point in the same direction as the magnetic field generated by the coil. If the coil is wrapped around only magnet 112A, the magnetic field generated by the coil may have little to no effect on magnet 112B. Even if the coil were wrapped around both magnets 112A and 112B, the amplitude and duration of the current passing through the coil may have values that will affect the magnetically semi-hard material of magnet 112A, and have little to no effect on the magnetically hard material of magnet 112B.

In an embodiment, when the conductive coil 115 or other switching device switches the polarity of the poles of magnet 112A to be opposite that of magnet 112B, the strength of the magnetic field of the magnetically semi-hard material of magnet 112A (e.g., 1 Tesla) may be sufficiently high to match or substantially match the strength of the magnetic field of the magnetically hard material of magnet 112B. Because the magnetic fields of magnets 112A and 112B are in opposite directions, they may in effect substantially cancel each other. In this situation, the net magnetic field of the electropermanent magnet 112 may be considered to be deactivated (also referred to as being closed). When its net magnetic field is deactivated, the electropermanent magnet 112 may have very limited or no interaction with surrounding ferromagnetic material, such as the layer 114A of ferromagnetic material. The layer 114A of ferromagnetic material may then be in an unactuated position, or may return to an unactuated position, when the net magnetic field of the electropermanent magnet 112 is deactivated, as illustrated in FIG. 2A.

In an embodiment, the net magnetic field of the electropermanent magnet 112 may be activated by reversing the magnetization of magnet 112A so that its magnetic field aligns or corresponds with the magnetic field of magnet 112B, as shown in FIG. 2B. For instance, the conductive coil or other switching device may reverse the polarity of the magnetic poles of magnet 112A from what is shown in FIG. 2A. In some examples, the net magnetic field of the electropermanent magnet 112, in the activated state, may have a strength on the order of several Teslas. When its net magnetic field is activated, the electropermanent magnet 112 may actuate the layer 114A of ferromagnetic material, such as via a magnetic force attracting the layer 114A towards the second end 112Y (e.g., top end) of the magnet 112. In some cases, when the net magnetic field of the electropermanent magnet 112 is in the activated state, the electropermanent magnet 112 exerts a force of at least 1 G on the layer 114A of ferromagnetic material (or on a layer of magneto-active polymer). In an embodiment, the haptic actuator 110 is not a linear resonant actuator (LRA), solenoid resonant actuator (SRA), or eccentric rotating mass (ERM) actuator, and may be configured to generate a force that is greater than the force generated by those other types of actuators. In another embodiment, the haptic actuator 110 may be a LRA or SRA. In an embodiment, the haptic actuator is not an inertial based actuator, and can be run even at low frequencies (e.g., <10 Hz). In an embodiment, the haptic actuator can be considered an inertial based actuator if the layer 114A has a mass that exceeds a predefined threshold.

In an embodiment, the electropermanent magnet 112 may have a thickness along an axis 117 of the net magnetic field thereof that is in a range of between 100 microns and 1 mm. In some instances, a distance (e.g., a gap) between a second end 112Y of the electropermanent magnet and the layer 114A of ferromagnetic material (or layer of magneto-active polymer) may be in a range of between 20 µm and 50 µm.

Figure 2C:
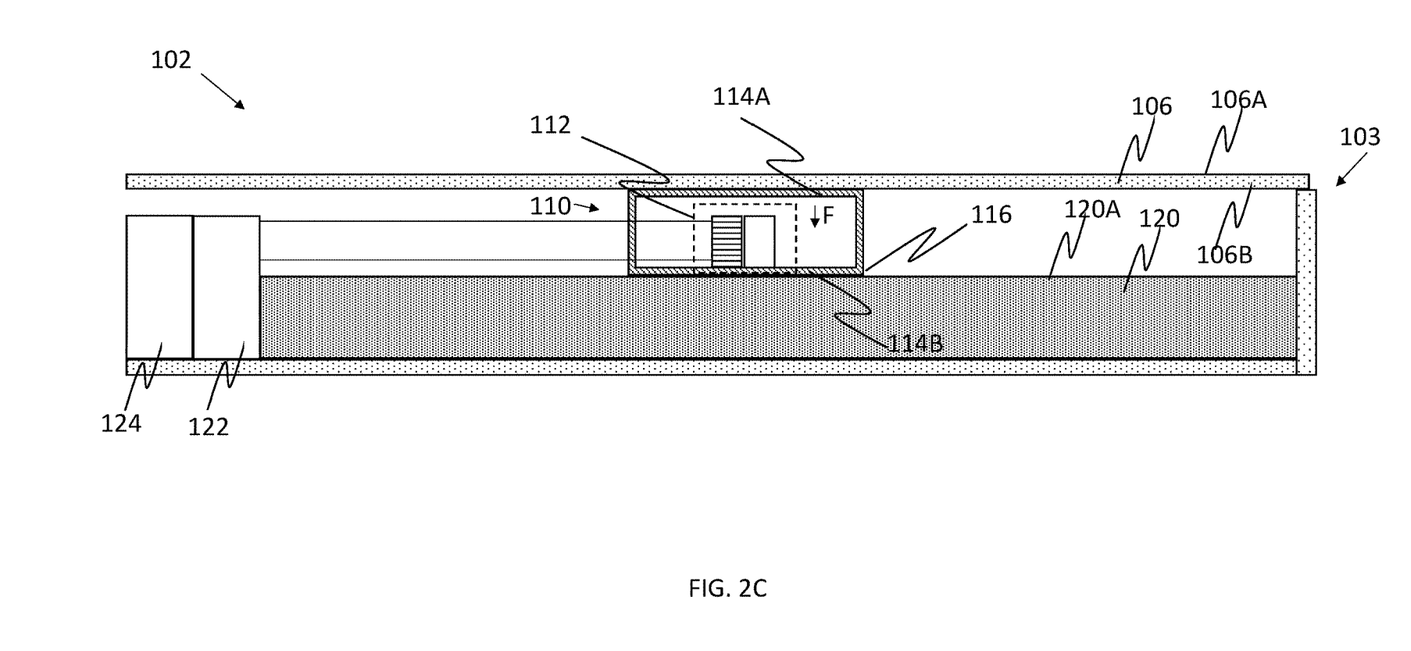
FIG. 2C is a sectional view of a haptic actuator in a user interface device, where the haptic actuator has an electropermanent magnet, according to an embodiment hereof.

FIG. 2C shows a sectional view, in the direction of the arrow A in FIG. 2A, of the haptic actuator 110 and a haptic enabled device (e.g., user interface device 102) that incorporates the haptic actuator 110. The haptic enabled device 102 may include, in addition to the haptic actuator 110, a housing 103 having a support substrate 120 on which the haptic actuator 110 is mounted. For instance, the haptic actuator 110 may be mounted on a support surface 120A of the support substrate 120. The housing 103 of the haptic enabled device 102 may house a power source 122 and a haptic controller 124, and may support a surface layer 106, such as a touch screen layer. The surface layer 106 may have a front face 106A that forms part of an exterior surface of the haptic enabled device, and a back surface 106B that forms part of an interior surface of the haptic enabled device.

In an embodiment, when the net magnetic field of the electropermanent magnet 112 is activated, the layer 114A of ferromagnetic material may be actuated inward, toward, e.g., a top end 112Y of the electropermanent magnet 112, in the direction of the arrow F shown in FIG. 2C. The net magnetic field of the electropermanent magnet 112 may be activated and then deactivated by an external input, such as an electrical current (e.g., AC current) provided by the power source 122 to the conductive coil 115 shown in FIGS. 2A-2B. The power source 122 may be controlled by the haptic controller 124, which may control various parameters of the external input, such as current frequency, current amplitude, current phase, duty cycle, or any combination thereof. In an embodiment, the net magnetic field of the electropermanent magnet 112 may be activated and deactivated in a cyclical manner, by applying an AC current (e.g., sine wave or square wave) or other cyclical input to the device (e.g., conductive coil) configured to switch the magnetic poles of magnet 112A. The frequency at which the net magnetic field is activated and deactivated may correspond to (e.g., equal) a frequency of the AC current. In some cases, the controller 124 may control the frequency based on whether the haptic actuator is to generate a vibration-based haptic effect or whether the haptic actuator is to generate a non-vibration-based haptic effect. For example, the controller may be configured to cause the alternating current to have a frequency between 1 Hz and 10 Hz in response to determining that the haptic actuator is to generate a non-vibration-based haptic effect, and is configured to cause the alternating current to have a frequency between 80 Hz and 200 Hz in response to determining that the haptic actuator is to generate a vibration-based haptic effect.

In the embodiment of FIG. 2C, the surface layer 106 of the haptic enabled device may be disposed on top of the haptic actuator 110 in such a manner that the back surface 106B of surface layer 106 contacts the layer 114A of ferromagnetic material. This arrangement allows vibrations in the layer 114A of ferromagnetic material to be transferred to the surface layer 106. In an embodiment, the layer 114A of ferromagnetic material may be adhered to a portion of the surface layer 106, via an adhesive or other method, in a manner such that an inward deformation of the layer 114A of ferromagnetic material creates a pulling force on at least the portion of the surface layer 106 to which it is adhered. This pulling force may also create an inward deformation of the portion of surface layer 106 that is adhered to the layer 114A. In another embodiment, however, an inward deformation of the layer 114 may have little or no effect on the surface layer 106. This may occur when, for instance, the layer 114A is not adhered to, but instead in close contact with, the surface layer 106.

Figure 3A:
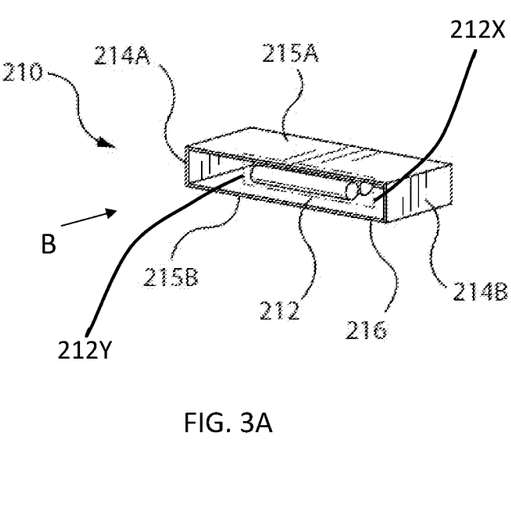
FIGS. 3A and 3B are perspective views of a haptic actuator having an electropermanent magnet, according to an embodiment hereof.
Figure 3B:
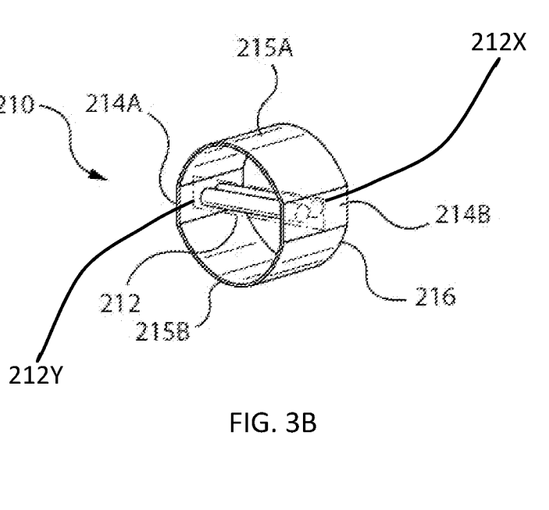
Figure 3C:
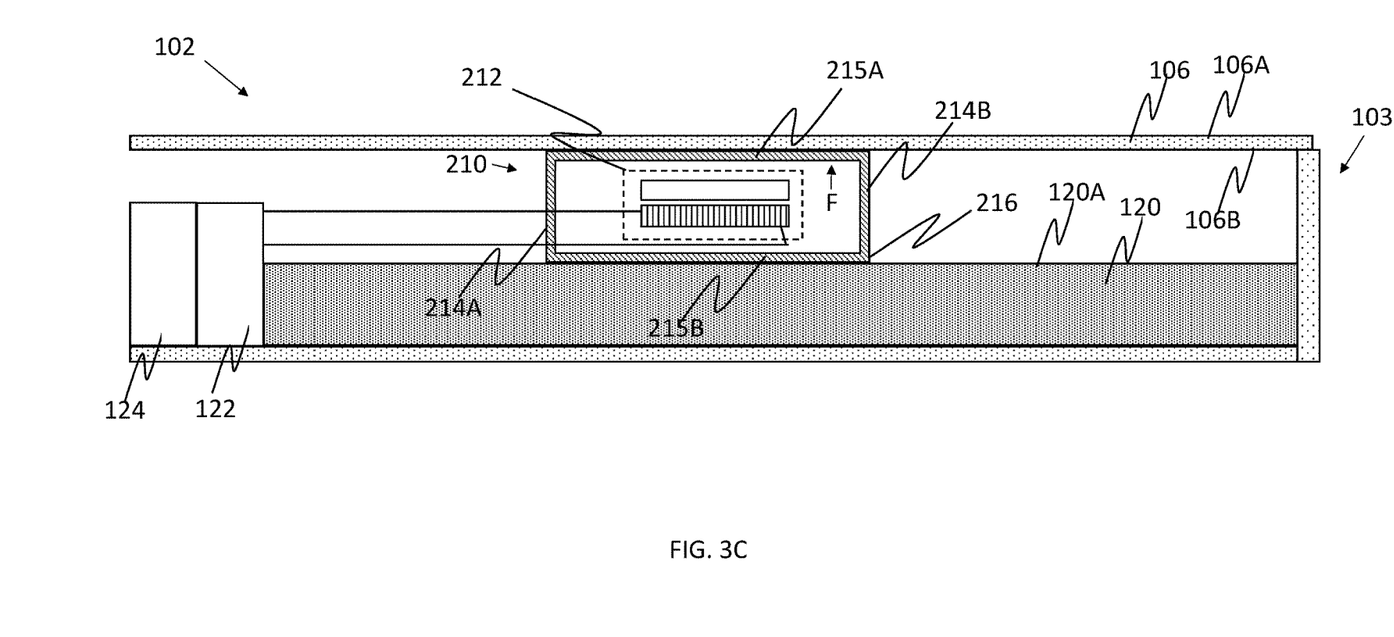
FIGS. 3C and 3D are sectional views of a haptic actuator having an electropermanent magnet in a user interface device, according to an embodiment hereof.

A haptic actuator of the embodiments described herein may be used to deform a surface layer 106 inward, as illustrated in FIG. 2C, or may be used to deform a surface layer 106 outward, as illustrated in at least FIGS. 3A-3C. In FIGS. 3A-3C, an electropermanent magnet 212 may still pull inward at least one layer 214A/214B of ferromagnetic material, such as a side 214A/214B of a metal casing 216, but this inward motion of one side 214A/214B of the casing may push at least one other side 215A/215B of the metal casing outward. More specifically, FIG. 3A shows a haptic actuator 210 that includes an electropermanent magnet 212 and a metal casing 216 housing the electropermanent magnet 212. In its undeformed state, the metal casing 216 may, e.g., be shaped as a rectangular frame having at least four sides. The metal casing 216 may include, e.g., two sides 214A and 214B that face respective first and second ends 212Y, 212X of the electropermanent magnet 212, and two adjacent sides 215A and 215B. Each of the sides 214A, 214B, 215A, 215B may comprise a layer of ferromagnetic material, or some of the sides (e.g., 215A and 215B) may alternatively or additionally include a different material, such as plastic. In an embodiment, the electropermanent magnet 212 may be suspended in the middle of the metal casing 216, as illustrated in FIGS. 3A-3B. For example, the electropermanent magnet 212 may be suspended via springs (not shown) which connect inner surfaces of the sides 214A and 214B to the respective first and second ends of the electropermanent magnet 212. In another embodiment, the electropermanent magnet 212 may be mounted on an inner surface of side 215A or side 215B of the metal casing 216. For example, if the electropermanent magnet 212 were mounted on an inner surface of side 215A, the electropermanent magnet may be configured to create an outward deformation in, e.g., only side 215B.

In an embodiment, when the net magnetic field of the electropermanent magnet 212 is deactivated, as illustrated in FIG. 3A, the electropermanent magnet 212 may have little or no interaction with the metal casing 216. When the net magnetic field of the electropermanent magnet 212 is activated, as illustrated in FIG. 3B, layer 214A and/or 214B of ferromagnetic material may be actuated toward (e.g., pulled toward) a respective first or second end of the electropermanent magnet 212. The actuation of the layer 214A/214B of ferromagnetic material toward the electropermanent magnet 212 (e.g., an inward deformation) may actuate or deflect other, i.e., top and bottom, layers 215A/215B away from the electropermanent magnet 212 (e.g., causing outward deformation).

FIG. 3C shows an embodiment of a haptic enabled device (e.g., user interface device 102) that incorporates the haptic actuator 210. In the arrangement of FIG. 3C, the electropermanent magnet 212 may have an orientation in which, when activated, its magnetic poles are aligned along an axis that is parallel to a surface layer 106 of the device 102. In this orientation, the layers 215A and 215B of the casing 216 may be parallel to the surface layer 106, while the layers 214A, 214B of ferromagnetic material may be orthogonal, or at another angle, to the surface layer 106. In FIG. 3C, the surface layer 106 may be disposed to be in contact with the layer 215A of the haptic actuator 210 when the layer 215A is in its undeformed or otherwise unactuated state. For instance, the surface layer 106 may be disposed so that its back surface 106B contacts layer 215A even when layer 215A is not being actuated. In this arrangement, when net magnetic field of the electropermanent magnet 212 is activated, the layer 215A may be actuated or deflected outward, and this actuation may in turn push or force a portion of the surface layer 106 outward.

Figure 3D:
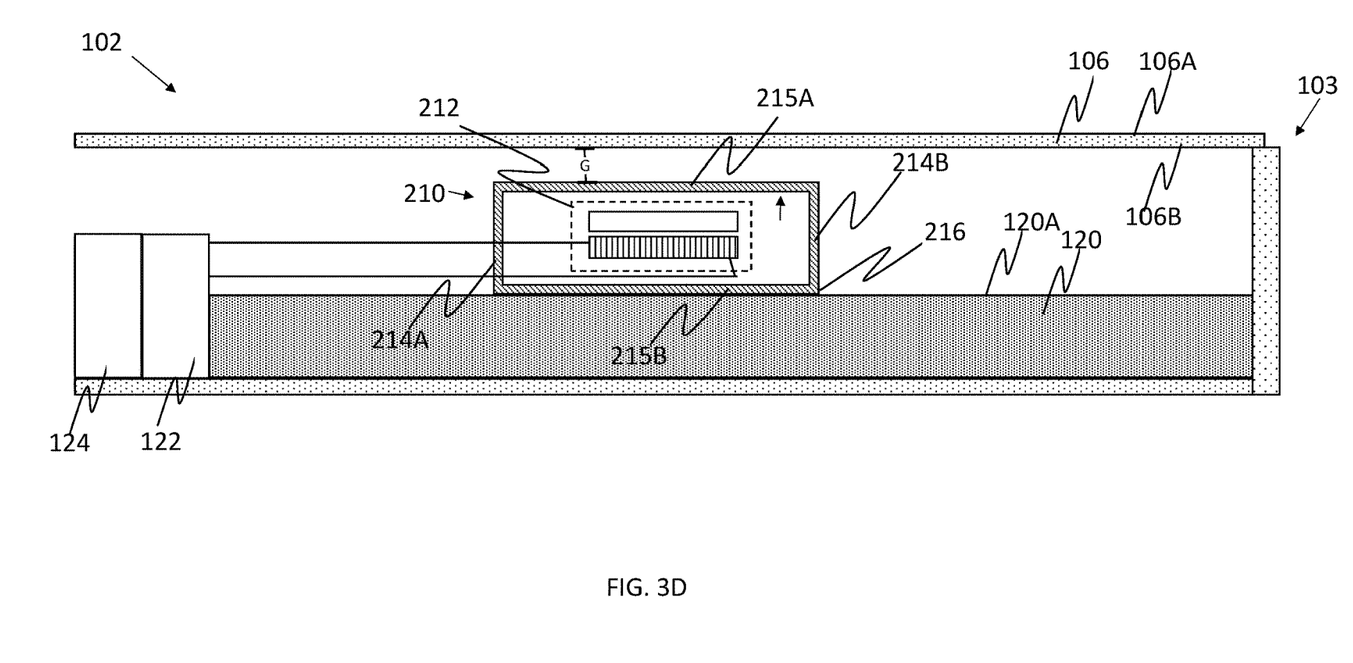

In another example illustrated in FIG. 3D, there may be a gap G between the back surface 106B of surface layer 106 and the layer 215A when the layer 215A is not being actuated. The gap may be equal to the programmed maximum deformation of the layer 215A, or may be less than the programmed maximum deformation of the layer 215A. The programmed maximum deformation of the layer 215A may be the distance by which the layer 215A is expected to deform when a programmed (e.g., predetermined) maximum current amplitude is applied to the electropermanent magnet 112. In one example, if the surface layer 106 were rigid, this gap provides space for the layer 215A to still deform. For instance, the gap G provides a space in which the layer 215A can vibrate. The gap may be small enough (less than or equal to the programmed maximum deformation of the layer 215A) to allow the layer 215A to touch or tap the surface layer 106 to transfer the vibration, so as to create a vibration-based haptic effect at the surface layer 106. If the gap G were less than the programmed maximum deformation of the layer 215A, the layer 215A may be able to transfer more general (e.g., low frequency) deformations to the surface layer 106.

Figure 4A:
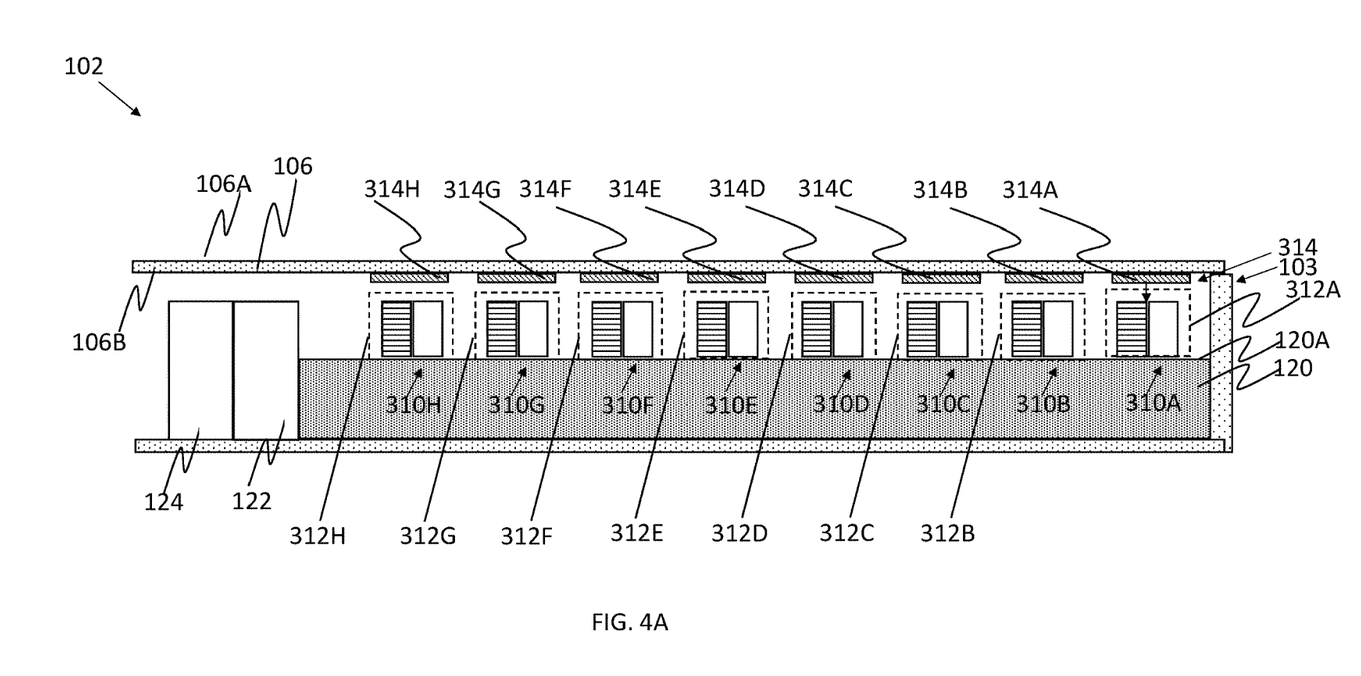
FIGS. 4A and 4B are sectional views of an array of haptic actuators that are in a user interface device, where the haptic actuators have corresponding electropermanent magnets, according to an embodiment hereof.
Figure 4B:
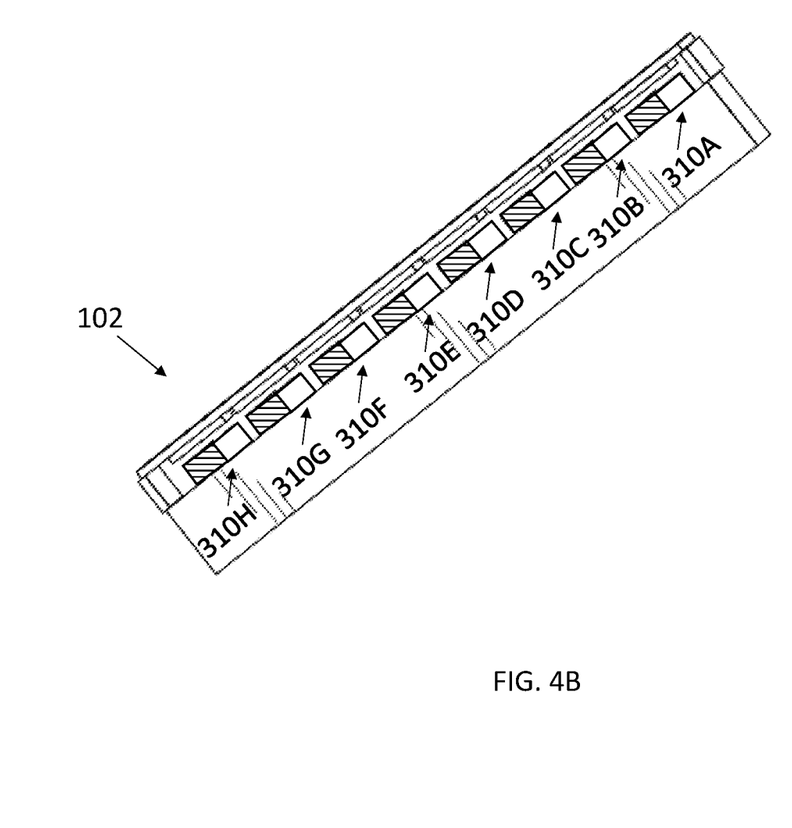

FIGS. 4A and 4B show a haptic enabled device (e.g., user interface device 102) that has an array of haptic actuators, including haptic actuators 310A-H. The array may be, e.g., a 1D or 2D array. Each haptic actuator of the array of haptic actuators in this embodiment (e.g., haptic actuator 310A) includes an electropermanent magnet (e.g., 312A) and a corresponding portion (e.g., 314A) of a layer 314 of magneto-active polymer. More particularly, the layer 314 of magneto-active polymer may be divided into co-planar portions (e.g., 314A through 314H) corresponding to respective electropermanent magnets 312A-312H. The layer 314 of magneto-active polymer may face the support surface 120A of a support substrate 120 on which the array of haptic actuators 310A-310H are mounted. The magneto-active polymer may include, e.g., a combination of a polymer matrix and ferromagnetic material. In an embodiment, the haptic actuators 310A-310H are at least partially enclosed by the housing 103, and do not include individual metal casings or other types of casings. In an embodiment, the haptic enabled device (e.g., user interface device 102) includes a display device (e.g., touch screen) that includes surface layer 106. The display device may be attached to housing 103. The display device may have a front surface 106A that forms part of the exterior surface of the haptic enabled device, and have a back surface 106B that forms part of the interior surface of the haptic enabled device.

In an embodiment, the layer 314 of magneto-active polymer may be attached to or in contact with the back surface 106B of the display device, and its portions 314A-314H may be located opposite an end (e.g., top end) of a respective electropermanent magnet of the plurality of electropermanent magnets 312A-312H. The portions 314A-314H of magneto-active polymer may be separated by, e.g., another polymer material, a paramagnetic or ferromagnetic material, by air, any other material, or any combination thereof. In another embodiment, the layer 314 of magneto-active polymer may be a coating on select portions of the back surface 106B of the display device. Each portion of the plurality of portions 314A-314H may be configured to generate the haptic effect at an exterior surface 106A of the haptic enabled device. In one example, this haptic effect may be created by causing the portion (e.g., 314A) of the layer 314 to be actuated toward a corresponding end of a respective electropermanent magnet (e.g., 312A) in response to the net magnetic field of the electropermanent magnet being in the activated state. This actuation may, e.g., be a part of a vibration that generates a vibrotactile haptic effect at the exterior surface 106A.

In an embodiment, any of the portions 314A-314H of the layer of magneto-active polymer may be individually and separately actuated by selectively activating a net magnetic field of a respective electropermanent magnet corresponding thereto. For instance, portion 314A of magneto-active polymer may be actuated at a higher frequency to generate a vibration at surface layer 106, or may be actuated at a lower frequency to generate a more general deformation-based haptic effect in which portion 314A of surface layer 106 is deformed inward. In an embodiment, a controller (e.g., controller 124) may be configured to separately activate the haptic actuators 310A-310H (i.e., activate their net magnetic fields) in an independent manner. For instance, the controller may be configured to select a subset of the array of haptic actuators to activate. In an embodiment, the controller may be configured to always activate some or all of the haptic actuators 310A-310H at the same time, or in a particular pattern, such as a sequential pattern.

Figure 5:
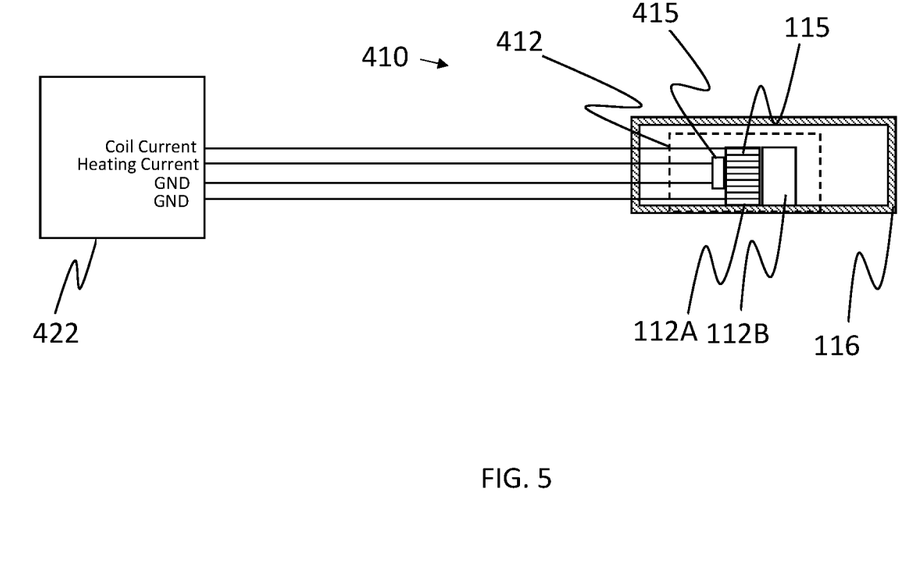
FIG. 5 is a view of a haptic actuator which has a heating element as part of a switching device configured to switch the polarity of magnetic poles of a first magnet in an electropermanent magnet.

As discussed above, a switching device may be used to switch the polarity of the magnetic poles of a magnet (e.g., magnet 112A) in an electropermanent magnet. FIG. 5 shows an embodiment in which the switching device includes a heating element. More specifically, FIG. 5 shows a haptic actuator 410 which includes an electropermanent magnet 412. The haptic actuator 410 includes an electropermanent magnet 412 mounted in the metal casing 116 shown in FIGS. 2A-2C. The electropermanent magnet 412 includes the magnet 112A made of magnetically semi-hard material and includes the magnet 112B made of magnetically hard material. The electropermanent magnet 412 further includes a coil 115 wrapped around magnet 112A and includes a heating element 415 (e.g., heating resistor) in contact with or otherwise near the magnet 112A. The coil 115 and heating element 415 may make up a switching device configured to switch the polarity of the magnetic poles of magnet 112A. For example, a DC heating current may be passed from a power source 422 through the heating element 415 to generate heat and increase a temperature of the magnet 112A. This increased temperature may contribute to lowering the magnetic field strength of the magnet 112A in a first direction. When an AC current is passed from the power source 422 to the coil 115, the increased temperature of the magnet 112A may make it easier, compared to the embodiment in FIGS. 2A-2C, for the current in the coil 115 to reverse the magnetic field of the magnet 112A to a second direction opposite the first direction, and thus to reverse the polarity of its magnetic poles.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A haptic enabled user interface device, comprising:
a housing; and
a haptic actuator mounted within the housing and configured to generate a haptic effect at an exterior surface of the haptic enabled user interface device,
wherein the haptic actuator comprises
a casing, and
an electropermanent magnet disposed in the casing, the electropermanent magnet having a deactivated state and an activated state for a net magnetic field thereof, wherein the electropermanent magnet comprises,
a first magnet having magnetic poles that are selectively switchable between a first polarity and a second polarity opposite the first polarity,
a second magnet adjacent to the first magnet and having magnetic poles of the second magnet fixed at the first polarity, wherein a material forming the first magnet has a lower magnetic coercivity than a material forming the second magnet, and
a conductive coil adjacent to the first magnet and configured to switch a polarity of the magnetic poles of the first magnet between the first polarity and the second polarity, and
wherein the casing comprises a layer of ferromagnetic material located opposite an end of the electropermanent magnet, and wherein when the net magnetic field of the electropermanent magnet is in the activated state, the electropermanent magnet is configured to generate the haptic effect by actuating the layer of ferromagnetic material.

2. The haptic enabled user interface device of claim 1, further comprising a power source configured to apply an electrical current to activate or deactivate the net magnetic field of the electropermanent magnet.

3. The haptic enabled user interface device of claim 2, wherein the electrical current is an alternating current having a frequency that is between 1 Hz and 10 Hz, and wherein the haptic effect is a deformation-based haptic effect.

4. The haptic enabled user interface device of claim 2, wherein the electrical current is an alternating current, wherein the haptic enabled user interface device further comprises a haptic controller, connected to the power source, that is configured to control a frequency of the alternating current based on whether the haptic actuator is to generate a vibration-based haptic effect or whether the haptic actuator is to generate a non-vibration-based haptic effect.

5. The haptic enabled user interface device of claim 1, wherein the material forming the second magnet includes neodymium.

6. The haptic enabled user interface device of claim 5, wherein the material forming the first magnet includes an aluminum nickel cobalt alloy.

7. The haptic enabled user interface device of claim 5, wherein the material forming the first magnet has a magnetic field strength that is in a range of 0.1 Tesla to 1 Tesla.

8. The haptic enabled user interface device of claim 1, wherein the housing comprises a surface layer that forms the exterior surface of the haptic enabled user interface device, wherein the layer of ferromagnetic material is adhered to the surface layer, and wherein the haptic effect is a deformation haptic effect that deforms a portion of the surface layer in an inward direction toward the electropermanent magnet.

9. The haptic enabled user interface device of claim 1, wherein the housing comprises a surface layer that forms the exterior surface of the haptic enabled user interface device, wherein the layer of ferromagnetic material is a first layer of the casing and is not parallel with the surface layer, wherein the casing has a second layer that is parallel with the surface layer, and wherein actuation of the first layer towards the electropermanent magnet causes deformation of the second layer away from the electropermanent magnet, and
wherein the haptic effect is a deformation haptic effect that deforms a portion of the surface layer in an outward direction away from the electropermanent magnet.

10. The haptic enabled user interface device of claim 1, wherein the haptic enabled user interface device is a mobile phone.

11. The haptic enabled user interface device of claim 1, wherein the haptic enabled user interface device is a game controller.

12. The haptic enabled user interface device of claim 1, wherein the ferromagnetic material comprises at least one of iron, cobalt, and nickel, and not comprising any of steel, aluminum, copper, lead, or zinc.

13. The haptic enabled user interface device of claim 1, wherein the electropermanent magnet has a thickness along an axis of the net magnetic field thereof that is in a range of 100 µm to 1 mm.

14. The haptic enabled user interface device of claim 1, wherein a distance between the end of the electropermanent magnet and the layer of ferromagnetic material is in a range of between 20 µm and 50 µm, and wherein a thickness of the layer of ferromagnetic material is in a range of between 0.2 mm and 5 mm.

15. The haptic enabled user interface device of claim 1, wherein the conductive coil is wrapped around only the first magnet.

16. A haptic enabled user interface device, comprising:
a housing; and
a haptic actuator mounted within the housing and configured to generate a haptic effect at an exterior surface of the haptic enabled user interface device, wherein the haptic actuator comprises
a casing, and
an electropermanent magnet disposed in the casing, the electropermanent magnet having a deactivated state and an activated state for a net magnetic field thereof, wherein the electropermanent magnet comprises
 a first magnet having magnetic poles that are selectively switchable between a first polarity and a second polarity opposite the first polarity,
 a second magnet adjacent to the first magnet and having magnetic poles of the second magnet fixed at the first polarity, wherein a material forming the first magnet has a lower magnetic coercivity than a material forming the second magnet, and
 a conductive coil adjacent to the first magnet and configured to switch a polarity of the magnetic poles of the first magnet between the first polarity and the second polarity, and
wherein the casing comprises a layer of magneto-active polymer located opposite an end of the electropermanent magnet, wherein the magneto-active polymer comprises a polymer matrix and ferromagnetic material, and
wherein when the net magnetic field of the electropermanent magnet is in the activated state, the electropermanent magnet is configured to generate the haptic effect by actuating the layer of magneto-active polymer.

17. A haptic enabled user interface device, comprising:
a housing having a support surface;
a display device attached to the housing and having a front surface that forms part of an exterior surface of the haptic enabled user interface device, and a back surface that forms part of an interior surface of the haptic enabled user interface device; and
an array of electropermanent magnets disposed on the support surface of the housing;
an array of corresponding portions of magneto-active polymer disposed on the back surface of the display device, wherein each portion of the array of corresponding portions of magneto-active polymer is located opposite an end of a corresponding electropermanent magnet of the array of electropermanent magnets,
wherein each electropermanent magnet of the array of electropermanent magnets has a deactivated state and an activated state for a net magnetic field thereof, and comprises
a corresponding first magnet,
a corresponding second magnet, and
a corresponding conductive coil,
wherein the corresponding first magnet has magnetic poles that are selectively switchable between a first polarity and a second polarity opposite the first polarity,
wherein the corresponding second magnet is adjacent to the corresponding first magnet and has magnetic poles of the corresponding second magnet fixed at the first polarity, and
wherein the conductive coil is adjacent to the corresponding first magnet and is configured to switch a polarity of the magnetic poles of the corresponding first magnet between the first polarity and the second polarity, and
wherein each electropermanent magnet of the array of electropermanent magnets is configured, when the net magnetic field thereof is in the activated state, to generate a haptic effect at the front surface of the display device by actuating the corresponding portion of magneto-active polymer in an inwardly direction toward the electropermanent magnet.

18. The haptic enabled user interface device of claim 17, wherein a material forming the corresponding first magnet of any electropermanent magnet of the array of electropermanent magnets has a lower magnetic coercivity than a material forming the corresponding second magnet of the electropermanent magnet.

19. The haptic enabled user interface device of claim 17, wherein the corresponding portions of magneto-active polymer form a coating on the back surface of the display device.

20. The haptic enabled user interface device of claim 17, further comprising a haptic controller configured to select a subset of the array of electropermanent magnets to activate.

* * * * *